(12) United States Patent
Ell

(10) Patent No.: US 10,884,017 B2
(45) Date of Patent: Jan. 5, 2021

(54) ACOUSTIC ANGLE-OF-ATTACK SENSOR

(71) Applicant: Rosemount Aerospace Inc., Burnsville, MN (US)

(72) Inventor: Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 370 days.

(21) Appl. No.: 15/934,584

(22) Filed: Mar. 23, 2018

(65) Prior Publication Data

US 2019/0293677 A1 Sep. 26, 2019

(51) Int. Cl.
*B64D 43/02* (2006.01)
*G01P 13/02* (2006.01)
*G01P 5/24* (2006.01)

(52) U.S. Cl.
CPC ............ *G01P 13/025* (2013.01); *B64D 43/02* (2013.01); *G01P 5/245* (2013.01)

(58) Field of Classification Search
None
See application file for complete search history.

(56) References Cited

U.S. PATENT DOCUMENTS

| | | | |
|---|---|---|---|
| 3,120,756 A | 2/1964 | Knausenberger | |
| 3,222,926 A | 12/1965 | Carver | |
| 3,379,060 A | 4/1968 | Pear, Jr. | |
| 7,155,969 B2* | 1/2007 | Drutowski | G01P 5/245 73/170.02 |
| 8,104,339 B2* | 1/2012 | Elgersma | G01P 5/165 73/180 |
| 9,021,856 B2 | 5/2015 | Leblond et al. | |
| 9,612,252 B2* | 4/2017 | Waddington | G01P 5/24 |
| 10,101,443 B1* | 10/2018 | LeGrand, III | G01H 5/00 |
| 2006/0178790 A1 | 8/2006 | Shigemi et al. | |

FOREIGN PATENT DOCUMENTS

WO     WO 2018002740 A1     1/2018

OTHER PUBLICATIONS

Extended European Search Report for European Patent Application No. 19162980.7, dated Jul. 16, 2019, 10 pages.

* cited by examiner

Primary Examiner — Natalie Huls
Assistant Examiner — Jermaine L Jenkins
(74) Attorney, Agent, or Firm — Kinney & Lange, P.A.

(57) ABSTRACT

An angle-of-attack sensor includes at least one acoustic transmitter is configured to provide an acoustic pulse. The first acoustic receiver is positioned at a radial distance from the at least one acoustic transmitter. The first acoustic receiver is configured to receive the acoustic pulse at a first time and provide a first receiver signal. The second acoustic receiver is positioned at the radial distance from the at least one acoustic transmitter aligned with an axis that extends through the at least one acoustic transmitter and the first acoustic receiver. The second acoustic receiver is configured to receive the acoustic pulse at a second time and provide a second receiver signal. The angle-of-attack circuitry is configured to determine a delay difference between the first and second receiver signals representative of a difference between the first time and the second time and determine an angle-of-attack based upon the delay difference.

16 Claims, 9 Drawing Sheets

ACOUSTIC ANGLE-OF-ATTACK SENSOR

BACKGROUND

Angle-of-attack sensors work by aligning a vane with local airflow. The angle of the vane is compared to a reference line, such as aircraft fuselage horizontal, using a potentiometer or a rotary differential transformer. Angle-of-attack sensors are susceptible to failures caused by icing. Ice buildup prevents the vane from rotating, causing the angle-of-attack sensor to lockup and give incorrect values.

SUMMARY

In one example, an angle-of-attack sensor comprises at least one acoustic transmitter is configured to provide an acoustic pulse. The first acoustic receiver is positioned at a radial distance from the at least one acoustic transmitter. The first acoustic receiver is configured to receive the acoustic pulse at a first time and provide a first receiver signal. The second acoustic receiver is positioned at the radial distance from the at least one acoustic transmitter aligned with an axis that extends through the at least one acoustic transmitter and the first acoustic receiver. The second acoustic receiver is configured to receive the acoustic pulse at a second time and provide a second receiver signal. The angle-of-attack circuitry is configured to determine a delay difference between the first and second receiver signals representative of a difference between the first time and the second time and determine an angle-of-attack based upon the delay difference.

In one example, a method comprises emitting an acoustic pulse using at least one acoustic transmitter; receiving, at a first time, the acoustic pulse using a first acoustic receiver positioned at a radial distance from the at least one acoustic transmitter; providing a first receiver signal from the first acoustic receiver in response to receiving the acoustic pulse; receiving, at a second time, the acoustic pulse using a second acoustic receiver positioned at the radial distance from the at least one acoustic transmitter and aligned with an axis that extends through each of the at least one acoustic transmitter and the first acoustic receiver; providing a second receiver signal from the second acoustic receiver in response to receiving the acoustic pulse; determining a delay difference based upon the first and second receiver signals representative of a difference between the first time and the second time; and determining an angle-of-attack based upon the delay difference.

In one example, a system comprises at least one acoustic transmitter, a first acoustic receiver, a second acoustic receiver, one or more processors, and computer-readable memory. The first acoustic receiver is positioned at a radial distance from the at least one acoustic transmitter. The second acoustic receiver is positioned at the radial distance from the at least one acoustic transmitter. The computer-readable memory is encoded with instructions that, when executed by the one or more processors, cause the system to emit an acoustic pulse; receiving, at a first time, the acoustic pulse; provide a first receiver signal in response to receiving the acoustic pulse at the first time; receive, at a second time, the acoustic pulse; provide a second receiver signal in response to receiving the acoustic pulse at the second time; determine a delay difference based upon the first and second receiver signals representative of a difference between the first time and the second time; and determine an angle-of-attack based upon the delay difference.

DETAILED DESCRIPTION

Apparatus, systems, and associated methods relate to acoustic angle-of-attack sensors. Using the apparatus, systems, and associated methods herein, allows for sensing the angle-of-attack without mechanical moving parts or obstructing airflow. Additionally, this allows high bandwidth and update rate measurement of angle-of-attack.

Figure 1:
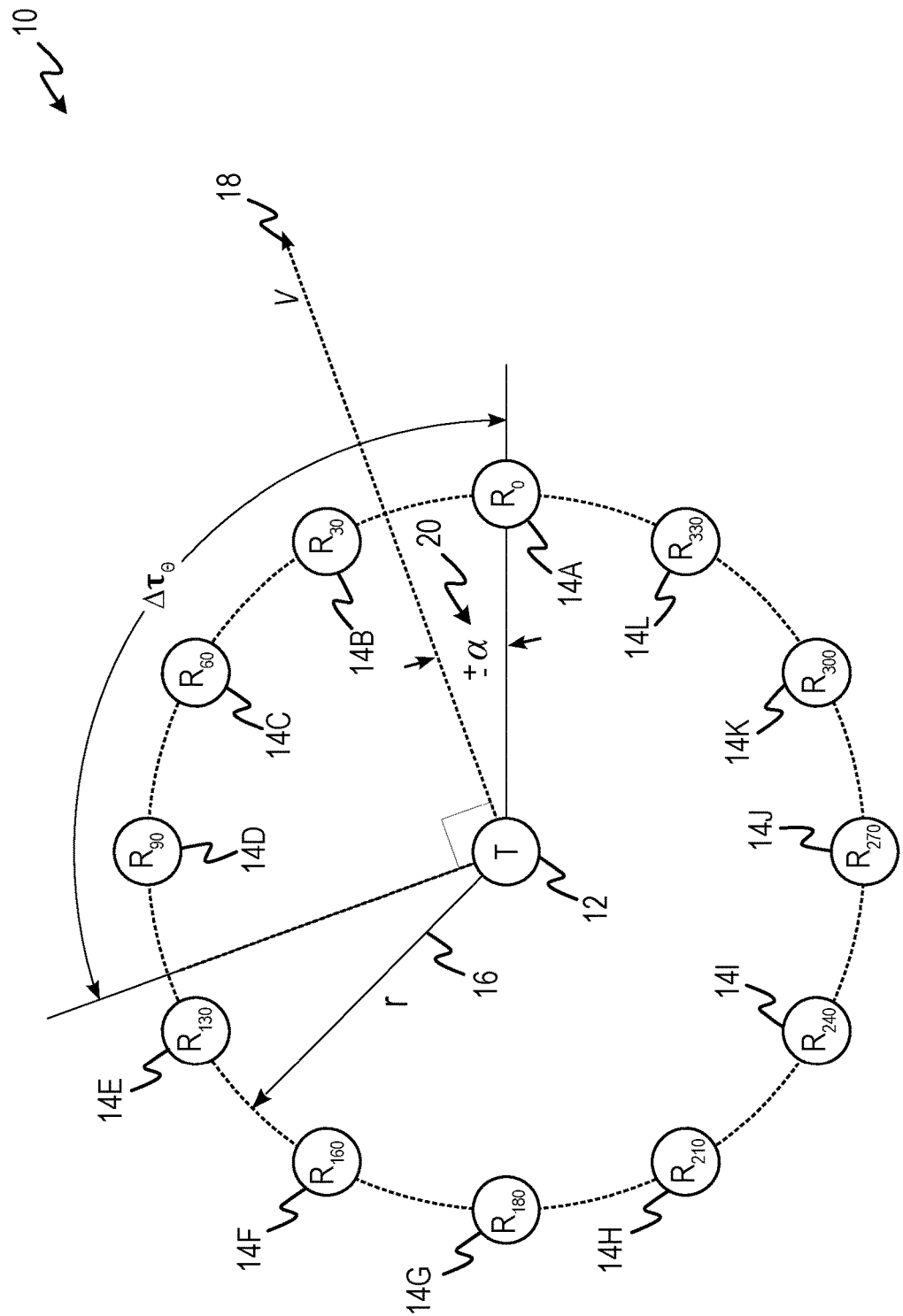
FIG. 1 is a top-down view of an acoustic angle-of-attack sensor.

FIG. 1 is a top-down view of acoustic angle-of-attack sensor 10 including acoustic transmitter 12, acoustic receivers 14A-14L, radius 16, airflow 18, and angle-of-attack 20.

Acoustic receivers 14A-14L are placed at a fixed radius (r) around acoustic transmitter 12. Acoustic transmitter 12 can be a piezoelectric speaker, cone speaker, microelectromechanical systems (MEMS) speaker, or other electric-to-acoustic transducer. Acoustic receivers can be microphones including MEMS microphones, condenser microphones, lasers, or other acoustic-to-electric transducer. Acoustic receivers 14A-14L are placed at 0°, 30°, 60°, 90°, 120°, 150°, 180°, 210°, 240°, 270°, 300°, and 330° respectively. The time-of-flight (τ) of an acoustic pulse emitted by acoustic transmitter 12 can be measured to each of acoustic receivers 14A-14L. The time-of-flight of the acoustic pulse from acoustic transmitter (T) 12 to each of acoustic receivers ($R_\theta$) 14A-14L placed at angle θ is given by:

$$\tau_\theta = \frac{r}{C_0 + |V|\cos(\theta - \alpha)} \quad \text{(Equation 1)}$$

where $C_0$ is the speed of sound, α is angle-of-attack 20, and V is the airspeed of airflow 18.

As shown in Equation 1, time-of-flight is impacted by the airspeed and angle-of-attack 20. The radius is constant because acoustic receivers 14A-14L are positioned at fixed radius 16 and angle from acoustic transmitter 12. The speed of sound in air is not impacted by angle-of-attack or airspeed. Therefore, for a known airspeed the only variable impacting the time-of-flight of the acoustic pulse to acoustic receivers 14A-14L is angle-of-attack 20.

Figure 2:
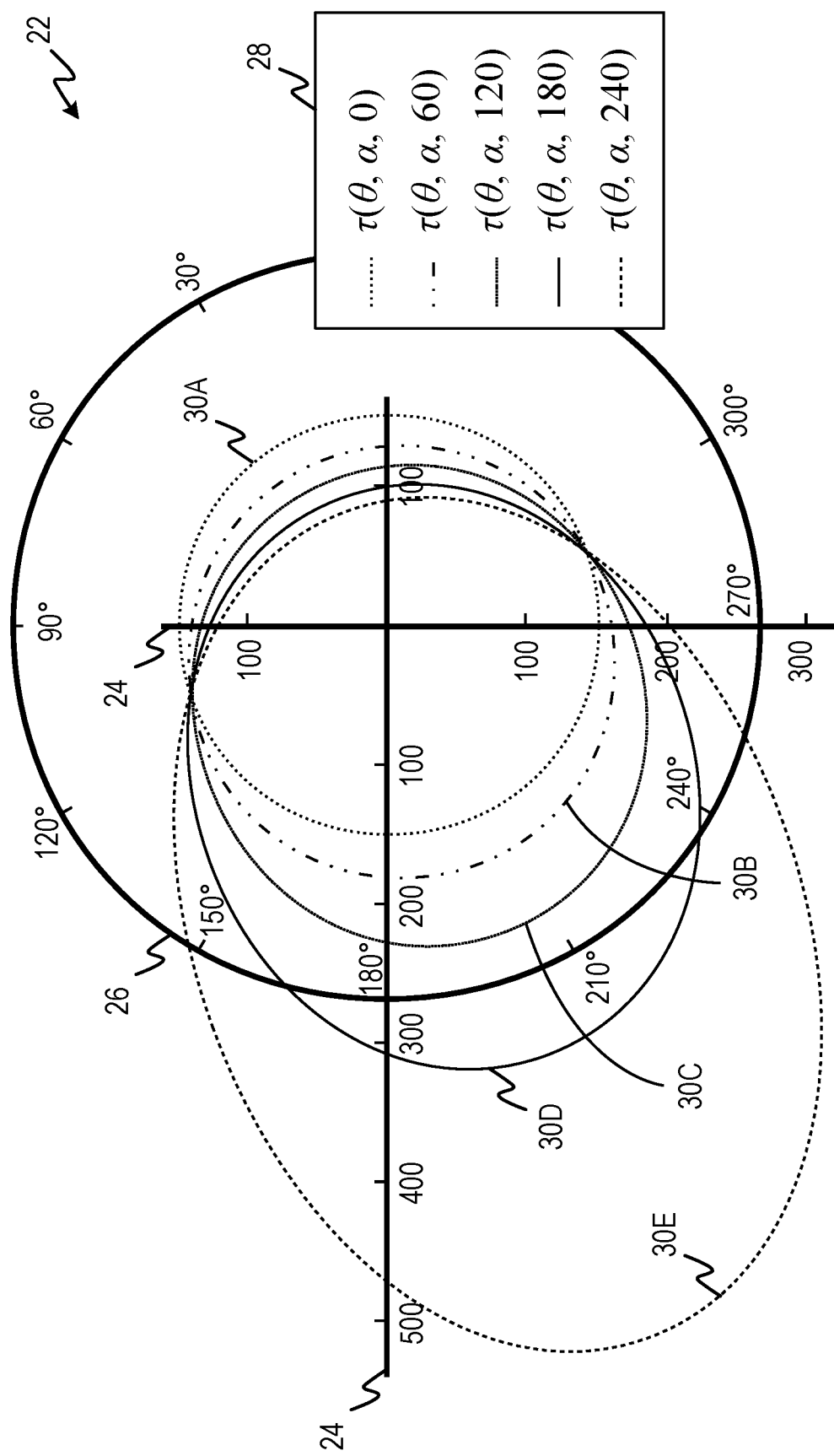
FIG. 2 is a polar plot depicting the time-of-flight between an acoustic transmitter and an acoustic receiver at various air speeds.

FIG. 2 is polar plot 22 including radial axis 24, angular axis 26, legend 28, and ellipses 30A-30E. For purposes of clarity and ease of discussion, FIG. 2 is described below within the context of acoustic angle-of-attack sensor 10 of FIG. 1.

Radial axis 24 indicates the time in micro-seconds. Angular axis 26 indicates the angle in degrees. Legend 28 matches each of ellipses 30A-30E to an airspeed. Ellipses 30A-30E represent the time it takes (time-of-flight) for a pulse to travel from acoustic transmitter 12 to radius 16 based upon angle-of-attack 20 and a given airspeed. Ellipses 30A-30E represent the time-of-flight at airspeeds of 0 meters per second (m/s), 60 m/s, 120 m/s, 180 m/s, and 240 m/s respectively. Ellipses 30A-30E can be derived using Equation 1 with an angle-of-attack of 20°, a radius of 0.05 meters, and a speed of sound of 331.45 m/s.

As shown in FIG. 2, air speed impacts the time-of-flight of the acoustic pulse at all angles except those angles 90° from angle-of-attack 20. Ellipses 30A-30E have the same time-of-flight at 110° and 290°. At 90° from angle-of-attack 20, the velocity term of Equation 1 is zero. This means that the speed of sound at an angle that is 90° from angle-of-attack 20 ($\theta_0$) can be determined from:

$$C_0 = \frac{r}{\tau_{\theta_0}} \qquad \text{(Equation 2)}$$

Figure 3:
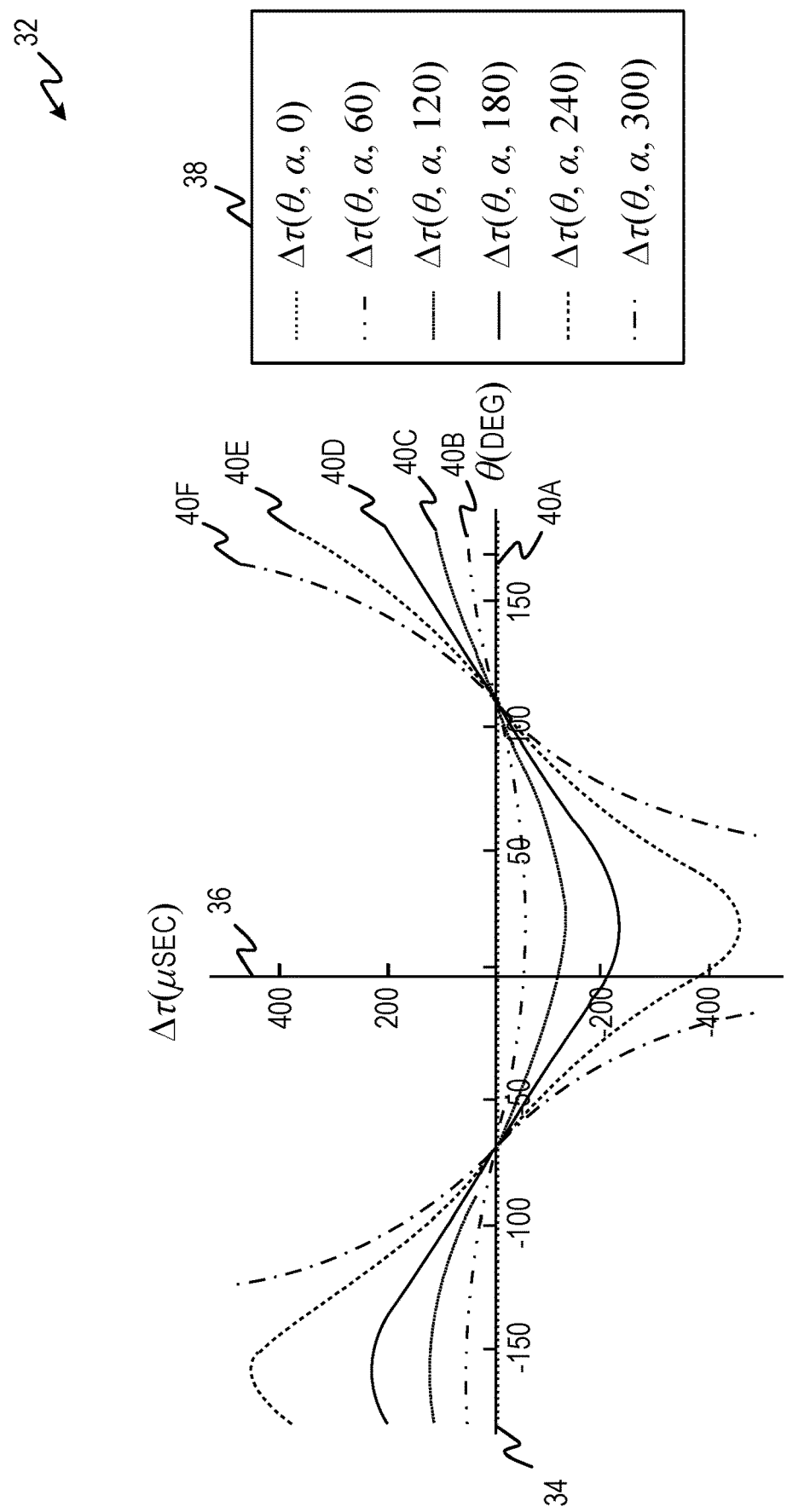
FIG. 3 is a graph depicting the time-of-flight difference between opposing acoustic receivers.

FIG. 3 is graph 32 depicting including x-axis 34, y-axis 36, legend 38, and curves 40A-40F.

Graph 32 depicts the difference in time-of-flight ($\Delta\tau$) between opposing acoustic receivers $R_\theta$ and $R_{\theta+180°}$ given by:

$$\Delta\tau_\theta = \tau_\theta - \tau_{\theta+180°} \qquad \text{(Equation 3)}$$

with an angle-of-attack of 20° and a radius of 0.05 meters. X-axis 34 depicts the difference in time-of-flight in microseconds. Y-axis 36 depicts the angle in degrees. Legend 38 matches each of curves 40A-40F to a given airspeed. Curves 40A-40F represent the difference in time-of-flight of opposing acoustic receivers at airspeeds of 0 m/s, 60 m/s, 120 m/s, 180 m/s, 240 m/s and 300 m/s respectively. The zero-crossing of each of curves 40A-40F occurs at 90° from the angle-of-attack. Curves 40A-40F can be represented by polynomials. The polynomials will equal zero at 90° from the angle of attack.

Figure 4:
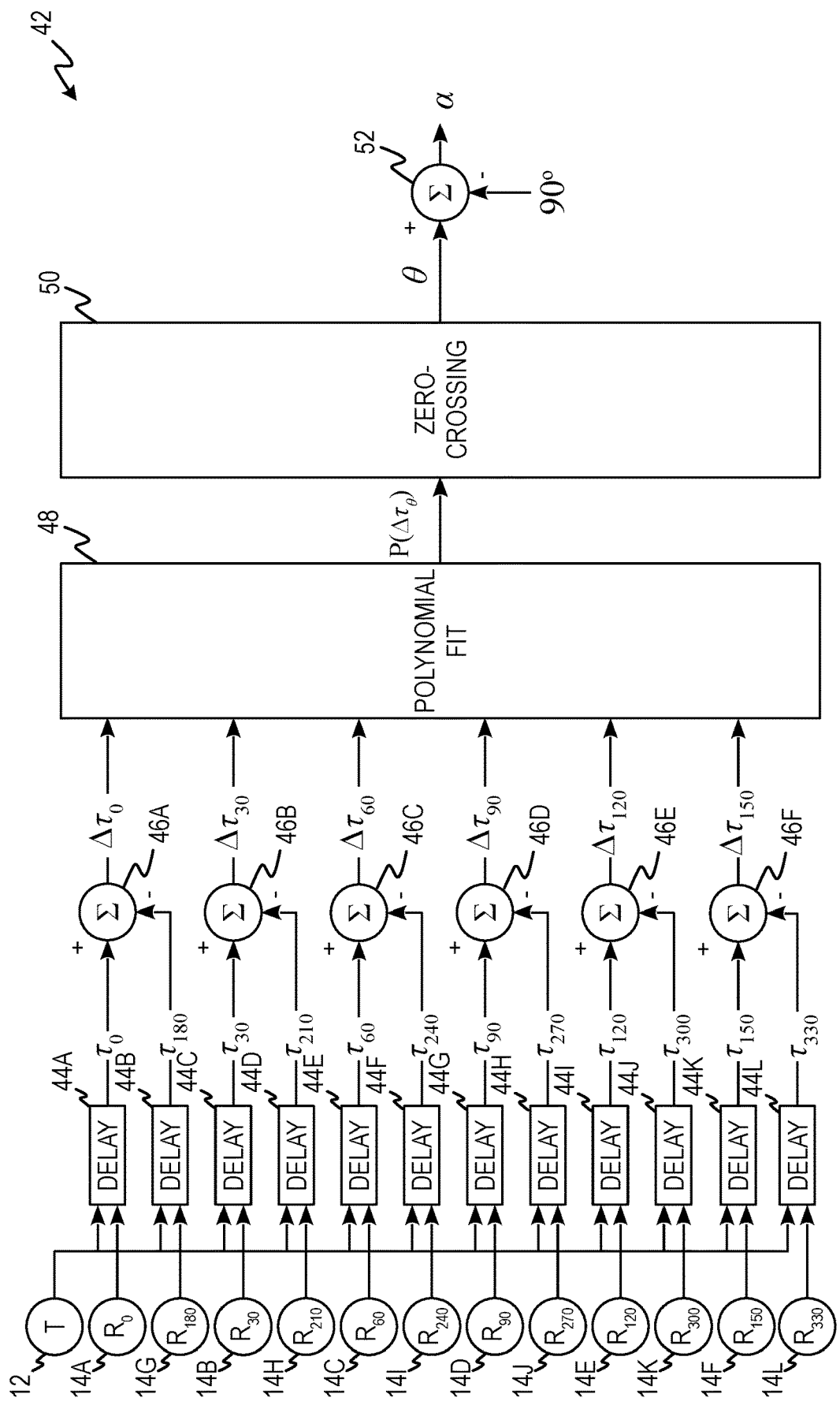
FIG. 4 is a system and software block diagram for a first example of an acoustic angle-of-attack sensor.

FIG. 4 is system diagram 42 for acoustic angle-of-attack sensor 10 of FIG. 1 including acoustic transmitter 12, acoustic receivers 14A-14L, delay circuitry 44A-44L, difference circuitry 46A-46F, polynomial fit circuitry 48, zero-crossing circuitry 50, and subtraction circuitry 52.

Acoustic transmitter 12 provides an electrical signal to delay circuitry 44A-44L representing the waveform of a transmitted acoustic pulse. Acoustic receivers 14A-14L provide signals to delay circuitry 44A-44L representing the waveform of the acoustic pulse received from acoustic transmitter 12. Delay circuitry 44A-44L extract the delay ($\tau_\theta$) between the transmitted and received waveforms and provide the extracted delays to difference circuitry 46A-46F. Each of difference circuitry 46A-46F receives the extracted delays of a pair of opposing (180° apart) acoustic receivers. Difference circuitry 46A-46F determine the difference in time-of-flight ($\Delta\tau_\theta$) between each pair of opposing acoustic receivers and provide the differences to polynomial fit circuitry 48. For clarity, FIG. 4 shows the relative timing of the transmitted and received signals with the delays ($\tau_\theta$) and delay differences ($\Delta\tau_\theta$) overlaid.

Polynomial fit circuitry 48 receives the time-of-flight differences from difference circuitry 46A-46F. Each time-of-flight difference represents two points, one on either side of zero, because the difference is associated with two acoustic receivers 180° apart. In one example, polynomial fit circuitry 48 determines the best least-squares polynomial fit about the two points. In another example, polynomial fit circuitry 48 determines the polynomial based upon known curves. Acoustic receivers 14A-14L are positioned at known angles ($R_\theta$) and known radius 16. Since the variables, except for angle-of-attack and airspeed, for determining the delays and therefore the delay differences are known, the delay difference curves are well established. This can be pictured using curves 40A-40F of FIG. 3 since they depict the difference in time-of-flight ($\Delta\tau$) between opposing acoustic receivers $R_\theta$ and $R_{\theta+180°}$ given by Equation 3. Polynomial fit circuitry 48 provides the polynomial ($P\Delta\tau_\theta$). Zero-crossing circuitry 50 receives the polynomial from polynomial fit circuitry 48. Zero-crossing circuitry 50 determines the angle ($\theta$) where the polynomial crosses zero. Zero-crossing circuitry 50 provides the angle where the polynomial crosses zero to subtraction circuitry 52. Subtraction circuitry 52 receives the angle from zero-crossing circuitry 50. Subtraction circuitry 52 determines the angle-of-attack ($\alpha$) by subtracting 90° from the angle provided by zero-crossing circuitry 50. Delay circuitry 44A-44L, difference circuitry 46A-46F, polynomial fit circuitry 48, zero-crossing circuitry 50, and subtraction circuitry 52 as described herein, can be implemented in hardware and/or software.

Figure 5:
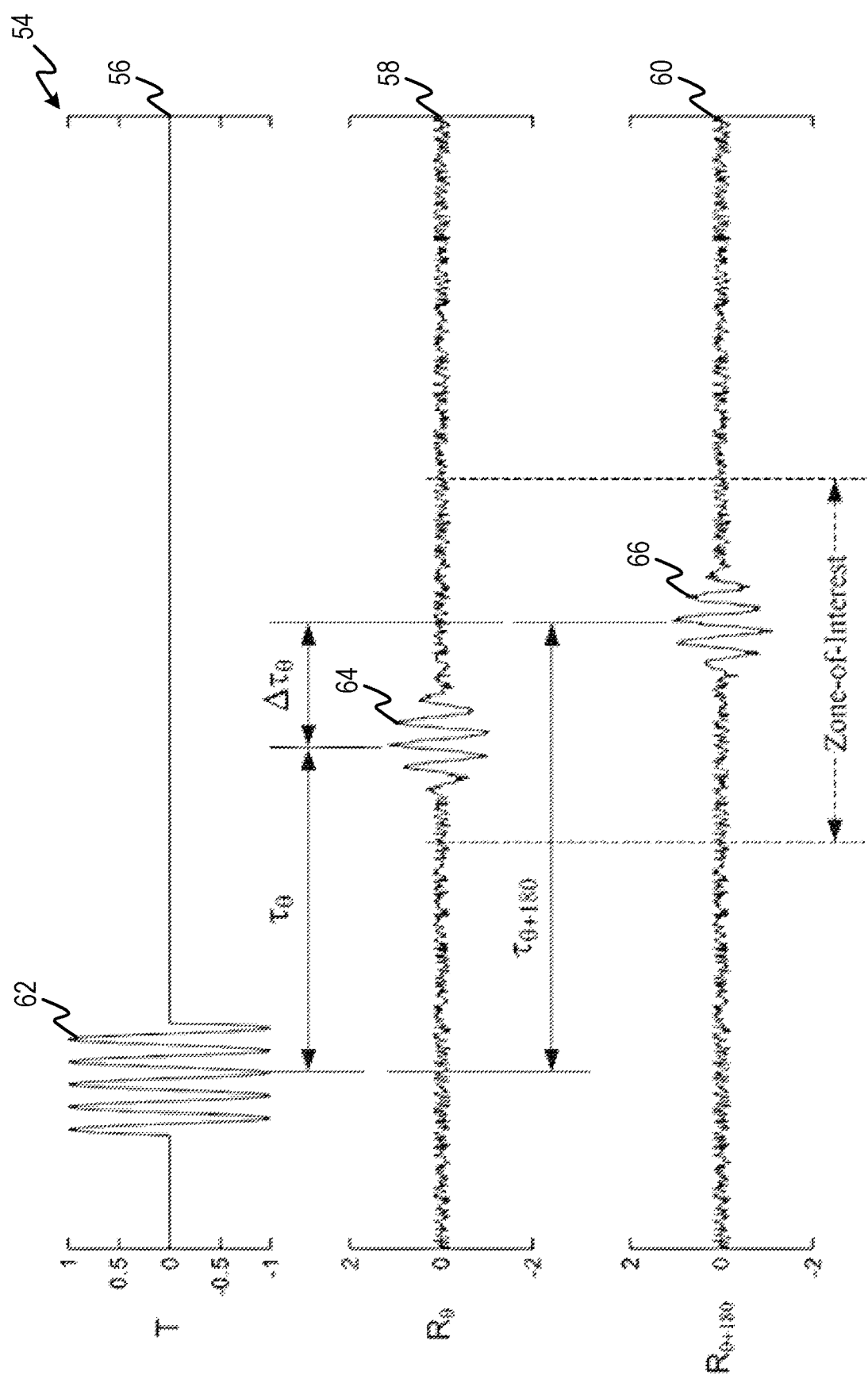
FIG. 5 is a pulse timing diagram of an acoustic angle-of-attack sensor.

FIG. 5 is pulse timing diagram 54 including acoustic transmitter waveform 56, acoustic receiver waveform 58, and opposing acoustic receiver waveform 60. Acoustic transmitter waveform 62 includes acoustic transmitter pulse 62. Acoustic receiver waveform 58 includes acoustic receiver pulse 64. Opposing acoustic receiver waveform 60 includes opposing acoustic receiver pulse 66.

Acoustic transmitter pulse 62 represents the acoustic pulse emitted by acoustic transmitter of an acoustic angle-of-attack sensor. Acoustic receiver pulse 64 represents the acoustic pulse sensed by a first acoustic receiver. Opposing acoustic receiver pulse 66 represents the acoustic pulse sensed by a second acoustic receiver, 180° from the first acoustic receiver, or opposing the first acoustic receiver. The timing diagram shows the time between the transmission of an acoustic pulse from the acoustic transmitter and the time the acoustic pulse is sensed by each of the first and second acoustic receivers. The zone-of-interest represents a time period that acoustic receiver pulse 64 and opposing acoustic receiver pulse 66 are received in.

Figure 6:
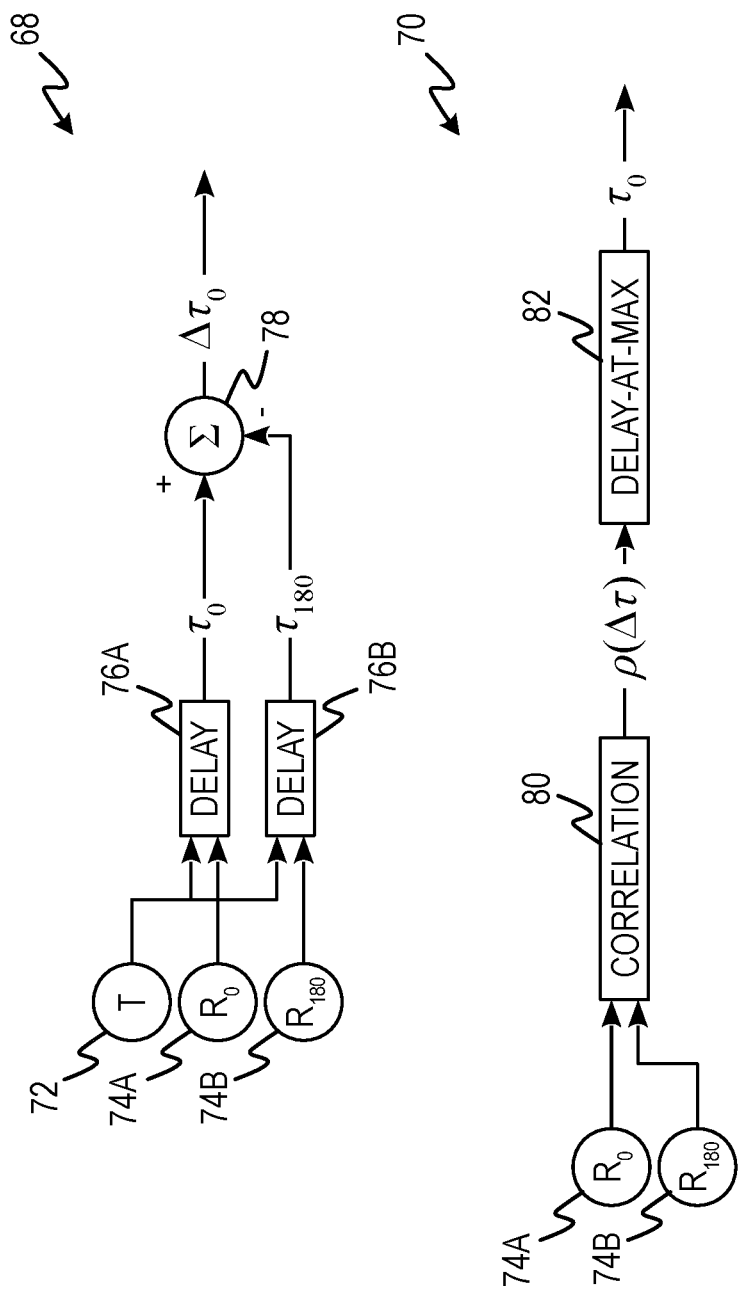
FIG. 6 depicts equivalent subsystems of an acoustic angle-of-attack sensor.

FIG. 6 depicts subsystems of two different embodiments of an acoustic angle-of-attack sensor, including delay subsystem 68 and cross-correlation subsystem 70. Delay subsystem 68 includes acoustic transmitter 72, acoustic receivers 74A and 74B, delay circuitry 76A and 76B, and difference circuitry 78. Cross-correlation subsystem 70 includes acoustic receivers 74A and 74B, cross-correlation circuitry 80, and max delay circuitry 82.

Delay subsystem 68 and cross-correlation subsystem 70 can be used interchangeably in an acoustic angle-of-attack sensor. Delay subsystem 68 represents a subsystem the acoustic angle-of-attack sensor system of system diagram 42 of FIG. 4. Acoustic transmitter 72 is representative of acoustic transmitter 12, acoustic receivers 74A and 74B are representative of acoustic receivers 14A and 14G, delay circuitry 76A and 76B are representative of delay circuitry 16A and 16B, and difference circuitry 78 is representative of difference circuitry 18A. Delay subsystem 68 uses delay circuitry 76A and 76B to determine the individual delays between the emission of an acoustic pulse by acoustic transmitter 72 and the reception of the acoustic pulse by acoustic receivers 74A and 74B. Difference circuitry 78 determines the delay difference ($\tau_\theta$) between acoustic receivers 74A and 74B based upon the individual delays.

In contrast, cross-correlation subsystem 70 uses cross-correlation circuitry 80 to produce a correlation signal ($\rho$) using signals provided by acoustic receivers 74A and 74B. The correlation signal represents a cross-correlation function of the signals provided by the acoustic receivers. Cross-correlation functions indicate how alike two signals are based upon shifting one of the signals a given amount in time. As shown in Max delay circuitry 82 determines a peak correlation of the correlation signal which corresponds to the delay difference ($\tau_\theta$). This can be seen in FIG. 5, that shifting opposing receiver waveform 60 left on the time axis a time equal to the delay difference would cause acoustic receiver pulse 64 and opposing acoustic receiver pulse 66 to align causing the greatest correlation between the two signals. Correlation circuitry 80 and max delay circuitry 82 can be used in place of delay circuitry 76A and 76B and difference circuitry 78.

Figure 7:
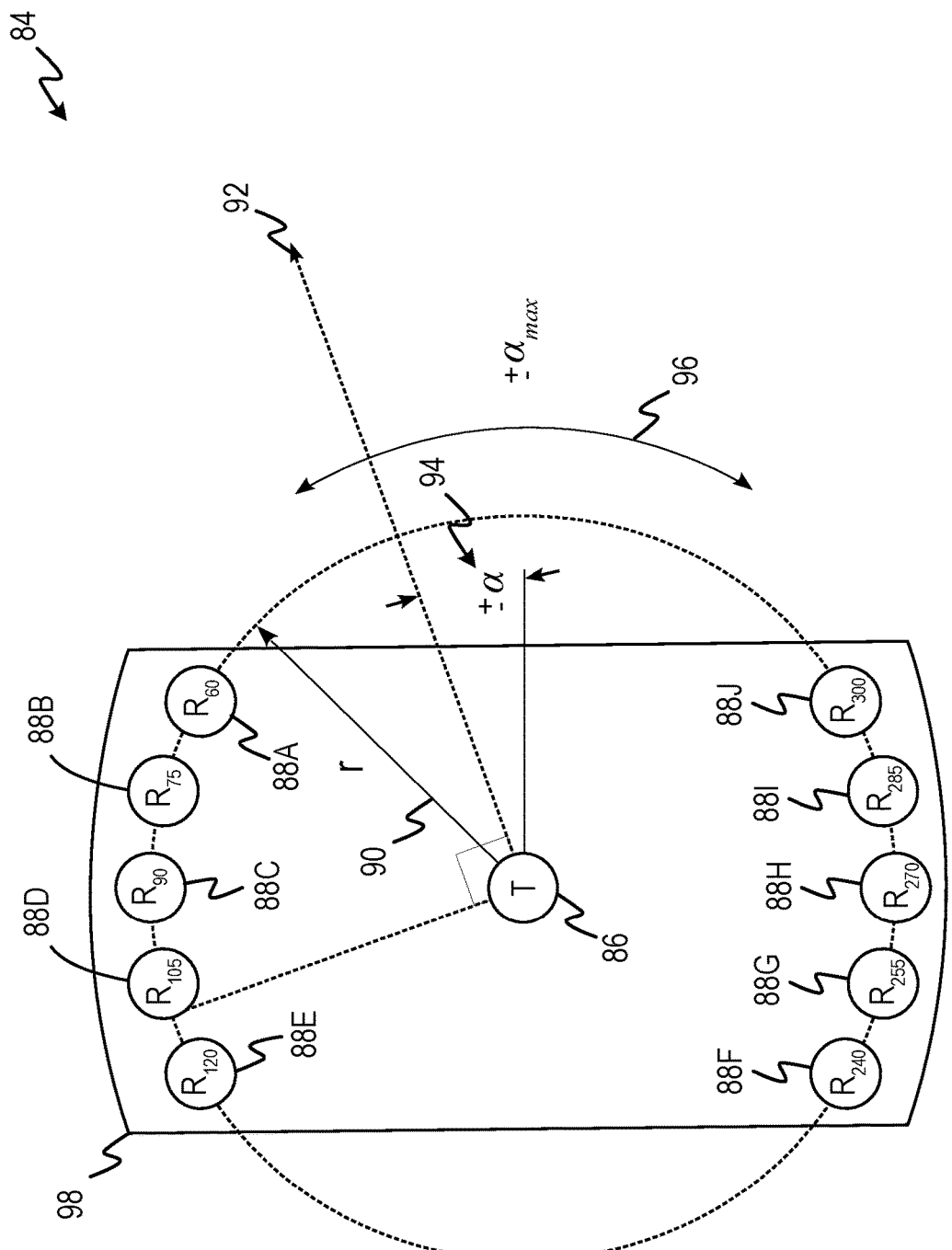
FIG. 7 is a top-down view of an acoustic angle-of-attack sensor with unrestricted airflow.

FIG. 7 is a top-down view of one example of acoustic angle-of-attack sensor 84 that is used when the angle-of-attack for a given use has a known limited range. In this example, angle-of-attack limit 96 is ±30°. Acoustic angle-of-attack sensor 84 includes acoustic transmitter 86, acoustic receivers 88A-88J, radius 90, airflow 92, angle-of-attack 94, angle-of-attack limit 96, and mounting plate 98.

Acoustic receivers 88A-88J are positioned along radius 90 orthogonal to angle-of-attack limit 96. This allows the use of fewer acoustic receivers and/or more densely populated acoustic receivers without increasing the amount of acoustic receivers. As shown, acoustic transmitter 86 and acoustic receivers 88A-88J are disposed on mounting plate 98. This would allow for simple installation and replacement of acoustic angle-of-attack sensor 84 as the whole sensor can be removed and replaced at once, rather than being embedded in, for example, an aircraft fuselage. In one example, acoustic transmitter 86 is an ultrasonic transmitter. An ultrasonic transmitter would not be heard by passengers. In one example, acoustic receivers 88A-88J include a high pass filter to filter out audible noise. As shown, airflow 92 is unobstructed across acoustic angle-of-attack sensor 84, thus reducing airflow disturbance and drag.

Figure 8:
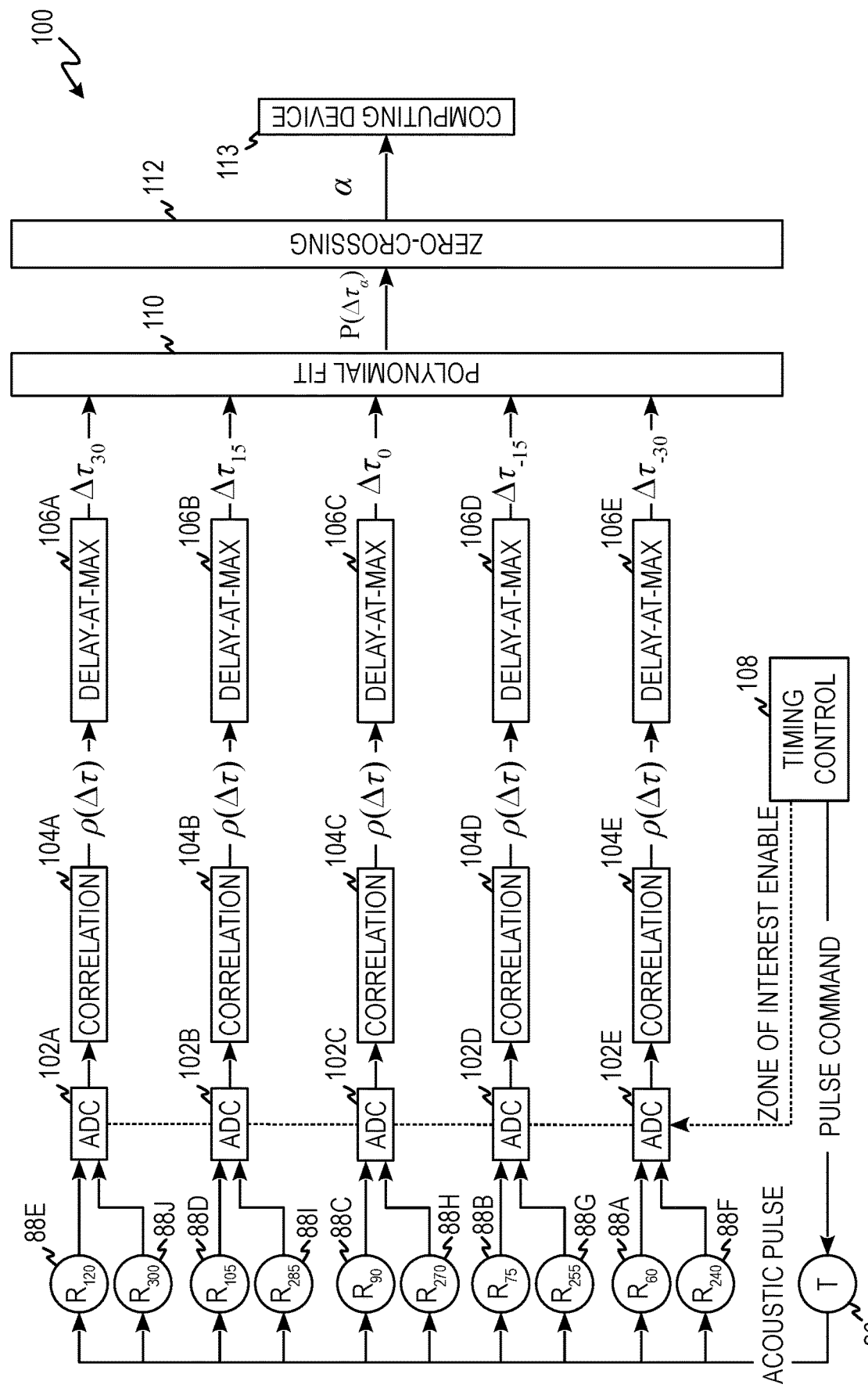
FIG. 8 is a system and software block diagram for a second example of an acoustic angle-of-attack sensor.

FIG. 8 is system diagram 100 including acoustic transmitter 86, acoustic receivers 88A-88J, analog-to-digital converters 102A-102E, cross-correlation circuitry 104A-104E, max delay circuitry 106A-106E, timing control circuitry 108, polynomial fit circuitry 110, zero-crossing circuitry 112, and computing device 113. For purposes of clarity and ease of discussion, system diagram 100 is discussed within the context of acoustic angle-of-attack sensor 84 of FIG. 7.

Timing control circuitry 108 is configured to provide a pulse command to acoustic transmitter 86. Acoustic transmitter 86 is configured to emit an acoustic pulse in response to receiving the pulse command. Acoustic receivers 88A-88E receive the acoustic pulse after a time delay that is impacted by airspeed 92 as indicated by Equation 1. Acoustic receivers 88A-88E provide receiver signals to analog-to-digital converters 102A-102E. Analog-to-digital converters 102A-102E convert the receiver signals to digital waveforms. Analog-to-digital converters 102A-102E provide the digital waveforms to cross-correlation circuitry 104A-104E. Cross-correlation circuitry 104A-104E receives the digital waveforms. Cross-correlation circuitry 104A-104E determines correlation signals ($\rho$) using the digital waveforms. The correlation signal represents a cross-correlation function of the signals provided by the acoustic receivers. Cross-correlation functions indicate how alike two signals are based upon shifting one of the signals a given amount in time. Cross-correlation circuitry 104A-104E provides the correlation signals to max delay circuitry 106A-106D. Max delay circuitry 106A-106D receives the cross-correlation signals. Max delay circuitry 106A-106D determines the peak correlations of the correlation signals. The peak correlations correspond to the delay differences ($\tau_\theta$) of acoustic receivers 88A-88J. Max delay circuitry 106A-106D provides the delay differences to polynomial fit circuitry 110.

Polynomial fit circuitry 110 receives the time-of-flight differences from max delay circuitry 106A-106D. Each time-of-flight difference represents two points, one on either side of zero, because the difference is associated with two acoustic receivers 180° apart. In one example, polynomial fit circuitry 110 determines the best least-squares polynomial fit about the two points. In another example, polynomial fit circuitry 48 determines the polynomial based upon known curves. Acoustic receivers 88A-88E are positioned at known angles ($R_\theta$) and known radius 90. Since the variables, except for angle-of-attack and airspeed, for determining the delays and therefore the delay differences are known, the delay difference curves are well established. Polynomial fit circuitry 110 provides the polynomial ($P\Delta\tau_\theta$). Zero-crossing circuitry 112 receives the polynomial from polynomial fit circuitry 110. Zero-crossing circuitry 112 determines the angle ($\alpha$) where the polynomial crosses zero. Zero-crossing circuitry 112 provides the angle where the polynomial crosses zero to computing device 113. Computing device can be an aircraft controller, engine controller, or other computing device. Analog-to-digital converters 102A-102E, cross-correlation circuitry 104A-104E, max delay circuitry 106A-106E, timing control circuitry 108, polynomial fit circuitry 110, zero-crossing circuitry 112, and computing device 113 as described herein, can be implemented in hardware and/or software such as a processor executing instructions of computer-readable memory.

Figure 9:
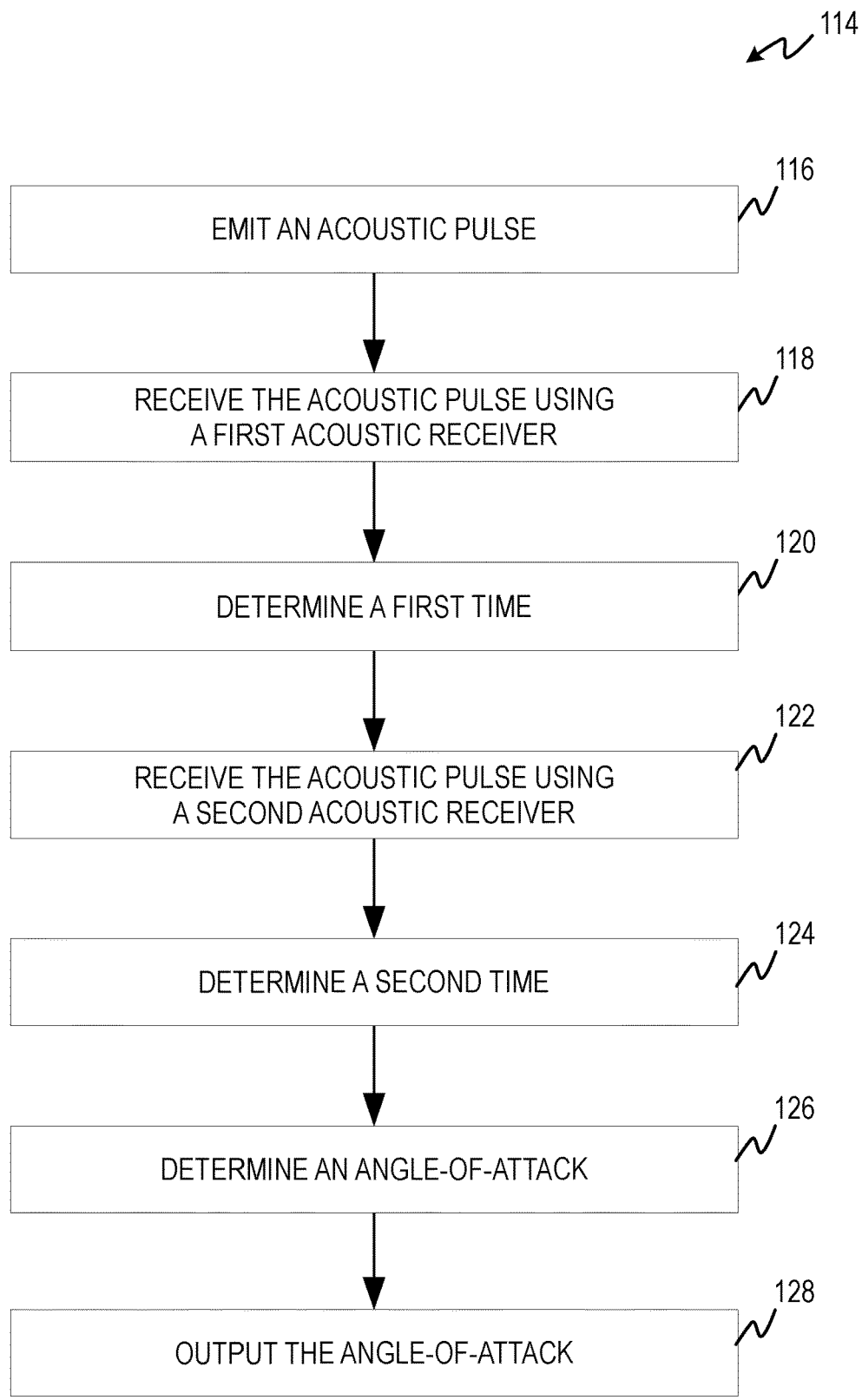
FIG. 9 is a flow chart of an acoustic angle-of-attack process.

FIG. 9 is a flow chart of acoustic angle-of-attack sensing process 114. For purposes of clarity and ease of discussion, angle-of-attack sensing process 114 is discussed in the context of system diagram 100 of FIG. 8.

At step 116, an acoustic pulse is emitted by acoustic transmitter 86. In one example, the acoustic pulse is emitted by acoustic transmitter 86 in response to receiving a pulse command from time control circuitry 108. At step 118, the acoustic pulse is received by acoustic receiver 88A. At step 120, acoustic receiver 88A provides a receiver signal in response to receiving the acoustic pulse. At step, 122, acoustic receiver 88F receives the acoustic pulse. At step 124, acoustic receiver 88F provides a receiver signal in response to receiving the acoustic pulse. At step 126, a delay difference between the first and second receiver signals is determined. In some examples, the delay difference is determined using delay circuitry 44A and difference circuitry 46A of FIG. 4. In other examples, the delay difference is determined using cross-correlation circuitry 104E and max delay circuitry 106E. At step 128, an angle-of-attack is determined based upon the delay difference. In some examples, the delay difference is used to determine a polynomial using polynomial fit circuitry 110. Zero-crossing circuitry 112 determines the angle that the polynomial equals zero to determine the angle-of-attack. At step 130, the angle-of-attack is provided to computing device 113. In one example computing device 113 is an aircraft controller.

Accordingly, implementing techniques of this disclosure, acoustic angle-of-attack sensors can be used accurately determine angle-of-attack without obstructing airflow or using mechanical moving parts. Using Acoustic angle-of-attack sensors as described herein, provides a high bandwidth and update rate measurement of angle-of-attack without placing sensor components directly into airflow. This lowers the icing risks of the angle-of-attack sensor and reduces airflow disturbance and drag.

Discussion of Possible Embodiments

The following are non-exclusive descriptions of possible embodiments of the present invention.

An angle-of-attack sensor can comprise at least one acoustic transmitter configured to provide an acoustic pulse; a first acoustic receiver positioned at a radial distance from the at least one acoustic transmitter, the first acoustic receiver configured to receive the acoustic pulse at a first time; and provide a first receiver signal; a second acoustic receiver positioned at the radial distance from the at least one acoustic transmitter aligned with an axis that extends through the at least one acoustic transmitter and the first acoustic receiver, the second acoustic receiver configured to receive the acoustic pulse at a second time; and provide a second receiver signal; and angle-of-attack circuitry configured to determine a delay difference between the first and second receiver signals representative of a difference between the first time and the second time; determine an angle-of-attack based upon the delay difference.

The angle-of-attack sensor of the preceding paragraph can optionally include, additionally and/or alternatively, any one or more of the following features, configurations and/or additional components:

The angle-of-attack circuitry can comprise polynomial fit circuitry configured to determine a polynomial based upon the delay difference and the position of the first and second acoustic receivers; and zero-crossing circuitry configured to determine an angle at which the polynomial equals zero; and determine the angle-of-attack based upon the angle.

The at least one acoustic transmitter can be further configured to provide a transmitter signal; and wherein the angle-of-attack circuitry comprises delay circuitry configured to determine a first delay based upon the transmitter signal and the first receiver signal; and determine a second delay based upon the transmitter signal and the second receiver signal; and difference circuitry configured to determine the delay difference between the first delay and the second delay; and provide the delay difference to the polynomial fit circuitry.

The angle-of-attack circuitry can comprise at least one analog-to-digital converter configured to sample the first and second receiver signals; and provide a digital waveform representing the first and second signals; correlation circuitry configured to determine a cross-correlation between the first and second receiver signals based upon the digital waveform; and provide a cross-correlation signal representative of the cross-correlation; and max delay circuitry configured to receive the cross-correlation signal; determine the delay difference between the first and second time based upon the cross-correlation signal; and provide the delay difference to the polynomial fit circuitry.

Timing control circuitry can be configured to provide a pulse command to the at least one acoustic transmitter and to provide an enable signal to the at least one analog-to-digital converter.

The angle-of-attack circuitry can be configured to output the angle-of-attack to an aircraft controller.

The first and second acoustic receivers can comprise microelectro-mechanical systems (MEMS) microphones.

A mounting plate; and wherein the at least one acoustic transmitter and the first and second acoustic receivers are disposed on the mounting plate.

The at least one acoustic transmitter can be an ultrasonic acoustic transmitter.

The first and second acoustic receivers can include a high pass filter.

The second acoustic receiver can be aligned with an axis that extends through the at least one acoustic transmitter and the first acoustic receiver.

The angle-of-attack circuitry can comprise one or more processors.

A method comprising: emitting an acoustic pulse using at least one acoustic transmitter; receiving, at a first time, the acoustic pulse using a first acoustic receiver positioned at a radial distance from the at least one acoustic transmitter; providing a first receiver signal from the first acoustic receiver in response to receiving the acoustic pulse; receiving, at a second time, the acoustic pulse using a second acoustic receiver positioned at the radial distance from the at least one acoustic transmitter and aligned with an axis that extends through each of the at least one acoustic transmitter and the first acoustic receiver; providing a second receiver signal from the second acoustic receiver in response to receiving the acoustic pulse; determining a delay difference based upon the first and second receiver signals representative of a difference between the first time and the second time; and determining an angle-of-attack based upon the delay difference.

The method of the preceding paragraph can optionally include, additionally and/or alternatively, any one or more of the following features, configurations and/or additional components:

Determining the angle-of-attack can comprise determining a polynomial based upon the delay difference and the position of the first and second acoustic receivers using polynomial fit circuitry; determining an angle at which the polynomial equals zero using zero-crossing circuitry; and determining the angle-of-attack based upon the angle using the zero-crossing circuitry.

Providing an electrical transmitter signal using the at least one acoustic transmitter; and wherein determining the delay difference comprises: determining a first delay based upon the electrical transmitter signal and the first receiver signal using delay circuitry; determining a second delay based upon the transmitter signal and the second receiver signal using the delay circuitry; determining the delay difference between the first delay and the second delay using difference circuitry; and providing the delay difference to the polynomial fit circuitry using the difference circuitry.

Determining the delay difference can comprise sampling the first and second receiver signals using an analog-to-digital converter; and providing a digital waveform representing the first and second signals using the analog-to-digital converter; determining cross-correlation between the first and second receiver signals based upon the digital waveform using correlation circuitry; providing a cross-correlation signal representative of the cross-correlation using the correlation circuitry; and receiving the cross-correlation signal using max delay circuitry; determining the delay difference between the first and second time based upon the cross-correlation signal using max the delay circuitry; and providing the delay difference to the polynomial fit circuitry using the max delay circuitry.

Providing a pulse command to the at least one acoustic transmitter using timing control circuitry; and providing an enable signal to the at least one analog-to-digital converter using timing control circuitry.

Outputting the angle-of-attack to an aircraft controller.

The first and second acoustic receivers can comprise microelectro-mechanical systems (MEMS) microphones.

The at least one acoustic transmitter and the first and second acoustic receivers can be disposed on the mounting plate.

Providing an acoustic pulse can comprises providing an ultrasonic pulse.

Filtering an acoustic signal using a high pass filter of the first and second acoustic receivers.

A system can comprise at least one acoustic transmitter; a first acoustic receiver positioned at a radial distance from the at least one acoustic transmitter; a second acoustic receiver positioned at the radial distance from the at least one acoustic transmitter; one or more processors; and computer-readable memory encoded with instructions that, when executed by the one or more processors, cause the system to emit an acoustic pulse; receiving, at a first time, the acoustic pulse; provide a first receiver signal in response to receiving the acoustic pulse at the first time; receive, at a second time, the acoustic pulse; provide a second receiver signal in response to receiving the acoustic pulse at the second time; determine a delay difference based upon the first and second receiver signals representative of a difference between the first time and the second time; and determine an angle-of-attack based upon the delay difference.

The system of the preceding paragraph can optionally include, additionally and/or alternatively, any one or more of the following features, configurations and/or additional components:

The computer-readable memory can be encoded with instructions that, when executed by the one or more processors, cause the system to determine a polynomial based upon the delay difference and the position of the first and second acoustic receivers; determine an angle at which the polynomial equals zero; and determine the angle-of-attack based upon the angle.

The computer-readable memory can be encoded with instructions that, when executed by the one or more processors, cause the system to provide an electrical transmitter signal; determine a first delay based upon the electrical transmitter signal and the first receiver signal; determine a second delay based upon the transmitter signal and the second receiver signal; and determine the delay difference between the first delay and the second delay.

The computer-readable memory can be encoded with instructions that, when executed by the one or more processors, cause the system to sample the first and second receiver signals; provide a digital waveform representing the first and second signals; determine cross-correlation between the first and second receiver signals based upon the digital waveform; and determine the delay difference between the first and second time based upon the cross-correlation.

At least one analog-to-digital converter, and wherein the computer-readable memory encoded with instructions that, when executed by the one or more processors, cause the system to provide a pulse command to the at least one acoustic transmitter; and provide an enable signal to the at least one analog-to-digital converter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An angle-of-attack sensor comprising:
at least one acoustic transmitter configured to provide an acoustic pulse;
a first acoustic receiver positioned at a radial distance from the at least one acoustic transmitter, the first acoustic receiver configured to:
receive the acoustic pulse at a first time; and
provide a first receiver signal;
a second acoustic receiver positioned at the radial distance from the at least one acoustic transmitter, the second acoustic receiver configured to:
receive the acoustic pulse at a second time; and
provide a second receiver signal; and
angle-of-attack circuitry configured to:
determine a delay difference between the first and second receiver signals representative of a difference between the first time and the second time;
determine an angle-of-attack based upon the delay difference;
wherein the angle-of-attack circuitry comprises:
polynomial fit circuitry configured to determine a polynomial based upon the delay difference and the position of the first and second acoustic receivers; and
zero-crossing circuitry configured to:
determine an angle at which the polynomial equals zero; and
determine the angle-of-attack based upon the angle.

2. The angle-of-attack sensor of claim 1, wherein:
the at least one acoustic transmitter is further configured to provide a transmitter signal; and
wherein the angle-of-attack circuitry comprises:
delay circuitry configured to:
determine a first delay based upon the transmitter signal and the first receiver signal; and
determine a second delay based upon the transmitter signal and the second receiver signal; and
difference circuitry configured to:
determine the delay difference between the first delay and the second delay; and
provide the delay difference to the polynomial fit circuitry.

3. The angle-of-attack sensor of claim 1, wherein the angle-of-attack circuitry comprises:
at least one analog-to-digital converter configured to:
sample the first and second receiver signals; and
provide a digital waveform representing the first and second signals;
correlation circuitry configured to:
determine a cross-correlation between the first and second receiver signals based upon the digital waveform; and provide a cross-correlation signal representative of the cross-correlation; and max delay circuitry configured to:
receive the cross-correlation signal;
determine the delay difference between the first and second time based upon the cross-correlation signal; and
provide the delay difference to the polynomial fit circuitry.

4. The angle-of-attack sensor of claim 3, further comprising timing control circuitry configured to provide a pulse command to the at least one acoustic transmitter and to provide an enable signal to the at least one analog-to-digital converter.

5. The angle-of-attack sensor of claim 1, wherein the angle-of-attack circuitry is configured to output the angle-of-attack to an aircraft controller.

6. The angle-of-attack sensor of claim 1, wherein the first and second acoustic receivers comprise microelectro-mechanical systems (MEMS) microphones.

7. The angle-of-attack sensor of claim 1, further including:
a mounting plate; and
wherein the at least one acoustic transmitter and the first and second acoustic receivers are disposed on the mounting plate.

8. The angle-of-attack sensor of claim 1, wherein the second acoustic receiver is aligned with an axis that extends through the at least one acoustic transmitter and the first acoustic receiver.

9. The angle-of-attack sensor of claim 1, wherein angle-of-attack circuitry comprises one or more processors.

10. A method comprising:
emitting an acoustic pulse using at least one acoustic transmitter;
receiving, at a first time, the acoustic pulse using a first acoustic receiver positioned at a radial distance from the at least one acoustic transmitter;
providing a first receiver signal from the first acoustic receiver in response to receiving the acoustic pulse;
receiving, at a second time, the acoustic pulse using a second acoustic receiver positioned at the radial distance from the at least one acoustic transmitter and aligned with an axis that extends through each of the at least one acoustic transmitter and the first acoustic receiver;
providing a second receiver signal from the second acoustic receiver in response to receiving the acoustic pulse;
determining a delay difference based upon the first and second receiver signals representative of a difference between the first time and the second time; and
determining an angle-of-attack based upon the delay difference;
wherein determining the angle-of-attack comprises:
determining a polynomial based upon the delay difference and the position of the first and second acoustic receivers using polynomial fit circuitry;
determining an angle at which the polynomial equals zero using zero-crossing circuitry; and
determining the angle-of-attack based upon the angle using the zero-crossing circuitry.

11. The method of claim 10, further comprising:
providing an electrical transmitter signal using the at least one acoustic transmitter; and
wherein determining the delay difference comprises:

determining a first delay based upon the electrical transmitter signal and the first receiver signal using delay circuitry;
determining a second delay based upon the transmitter signal and the second receiver signal using the delay circuitry;
determining the delay difference between the first delay and the second delay using difference circuitry; and
providing the delay difference to the polynomial fit circuitry using the difference circuitry.

12. The method of claim 10, wherein determining the delay difference comprises:
sampling the first and second receiver signals using an analog-to-digital converter; and
providing a digital waveform representing the first and second signals using the analog-to-digital converter;
determining cross-correlation between the first and second receiver signals based upon the digital waveform using correlation circuitry;
providing a cross-correlation signal representative of the cross-correlation using the correlation circuitry; and
receiving the cross-correlation signal using max delay circuitry;
determining the delay difference between the first and second time based upon the cross-correlation signal using max the delay circuitry; and
providing the delay difference to the polynomial fit circuitry using the max delay circuitry.

13. The method of claim 12, further comprising:
providing a pulse command to the at least one acoustic transmitter using timing control circuitry; and
providing an enable signal to the at least one analog-to-digital converter using timing control circuitry.

14. A system comprising:
at least one acoustic transmitter;
a first acoustic receiver positioned at a radial distance from the at least one acoustic transmitter;
a second acoustic receiver positioned at the radial distance from the at least one acoustic transmitter;
one or more processors; and
computer-readable memory encoded with instructions that, when executed by the one or more processors, cause the system to:
emit an acoustic pulse;
receiving, at a first time, the acoustic pulse;
provide a first receiver signal in response to receiving the acoustic pulse at the first time;
receive, at a second time, the acoustic pulse;
provide a second receiver signal in response to receiving the acoustic pulse at the second time;
determine a delay difference based upon the first and second receiver signals representative of a difference between the first time and the second time; and
determine an angle-of-attack based upon the delay difference;
wherein the instructions to determine the delay difference comprise instructions that, when executed by the one or more processors, cause the system to:
sample the first and second receiver signals;
provide a digital waveform representing the first and second signals;
determine cross-correlation between the first and second receiver signals based upon the digital waveform; and
determine the delay difference between the first and second time based upon the cross-correlation.

15. The system of claim 14, wherein the computer-readable memory encoded with instructions that, when executed by the one or more processors, cause the system to:
    determine a polynomial based upon the delay difference and the position of the first and second acoustic receivers;
    determine an angle at which the polynomial equals zero; and
    determine the angle-of-attack based upon the angle.

16. The system of claim 14, further comprising at least one analog-to-digital converter, and wherein the computer-readable memory encoded with instructions that, when executed by the one or more processors, cause the system to:
    provide a pulse command to the at least one acoustic transmitter;
    provide an enable signal to the at least one analog-to-digital converter; and
    and determine a speed of sound based upon the determined angle-of-attack.

* * * * *